United States Patent
Stephens

(10) Patent No.: US 7,456,995 B2
(45) Date of Patent: Nov. 25, 2008

(54) TECHNIQUES FOR ALIGNING IMAGES USING PAGE CHARACTERISTICS AND IMAGE SHIFTING

(75) Inventor: Vance M Stephens, Brush Prairie, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1154 days.

(21) Appl. No.: 09/870,878

(22) Filed: May 30, 2001

(65) Prior Publication Data

US 2002/0181021 A1   Dec. 5, 2002

(51) Int. Cl.
G06K 15/02 (2006.01)
G06K 15/00 (2006.01)
G06K 9/36 (2006.01)
G06K 9/32 (2006.01)
H04N 1/00 (2006.01)

(52) U.S. Cl. .................. 358/1.2; 358/1.12; 358/437; 382/289; 382/293; 382/295; 382/296; 382/298

(58) Field of Classification Search ................ 358/1.12, 358/1.2, 449, 488, 437; 382/289, 293, 295, 382/296, 298; 399/393, 394, 395, 388, 390
See application file for complete search history.

(56) References Cited

U.S. PATENT DOCUMENTS

| | | | |
|---|---|---|---|
| 4,162,844 A | | 7/1979 | Traister et al. |
| 4,538,905 A | | 9/1985 | Griego et al. |
| 4,755,855 A | * | 7/1988 | Watanabe ................. 399/86 |
| 5,093,674 A | * | 3/1992 | Storlie ...................... 347/116 |
| 5,397,192 A | * | 3/1995 | Khormaee ................ 400/708 |
| 5,461,459 A | * | 10/1995 | Muramatsu et al. .......... 399/15 |
| 5,555,084 A | | 9/1996 | Vetromile et al. |
| 6,052,552 A | * | 4/2000 | Ohsumi et al. .............. 399/394 |
| 6,118,950 A | * | 9/2000 | Wibbels et al. ............... 399/16 |
| 6,429,945 B1 | * | 8/2002 | Loffler ....................... 358/1.12 |
| 6,637,329 B1 | * | 10/2003 | Madeley ..................... 101/296 |
| 6,667,756 B2 | * | 12/2003 | Conrow et al. ............. 347/248 |
| 6,718,071 B2 | * | 4/2004 | Yoshida et al. .............. 382/289 |
| 6,785,428 B1 | * | 8/2004 | Stolin ....................... 382/295 |
| 6,799,761 B2 | * | 10/2004 | Kato ......................... 271/242 |
| 6,807,320 B1 | * | 10/2004 | Sawada ..................... 382/289 |
| 6,888,650 B1 | * | 5/2005 | Mizubata et al. ........... 358/488 |

FOREIGN PATENT DOCUMENTS

EP   0 469 282   5/1992

OTHER PUBLICATIONS

English Translation of German Patent Office Action of Jul. 2, 2004, regarding corresponding German Application No. 10220362.8-51 (3 pgs).

* cited by examiner

*Primary Examiner*—Edward L Coles
*Assistant Examiner*—Thomas J Lett

(57) ABSTRACT

Techniques for printing an image on a print medium. Information regarding the actual size of the medium, or the actual placement of the medium at a print zone, is used to shift the image to properly align the image on the medium. The image can be shifted digitally, or by movement of the medium relative to the printing element.

17 Claims, 6 Drawing Sheets

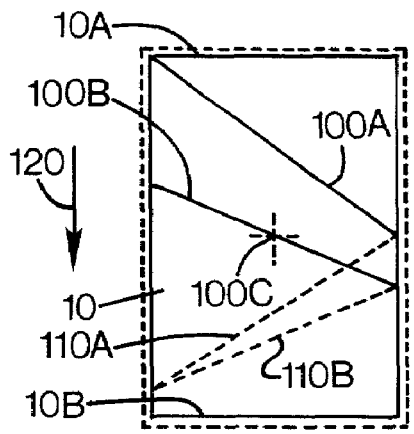
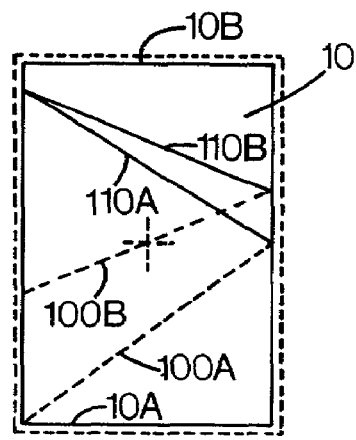
FIG. 3A    FIG. 3B
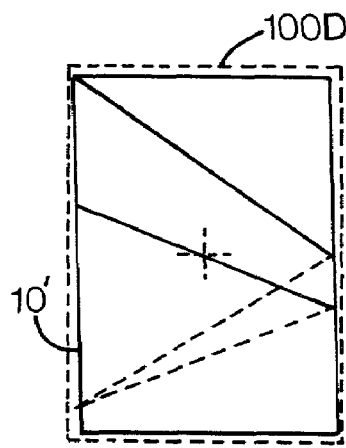
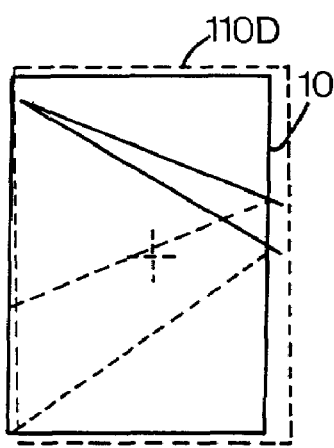
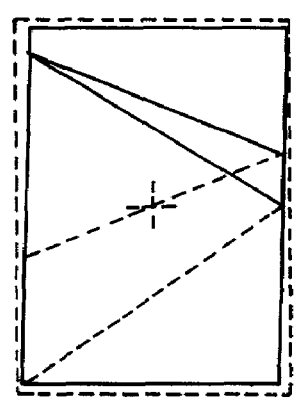
FIG. 4A    FIG. 4B    FIG. 4C

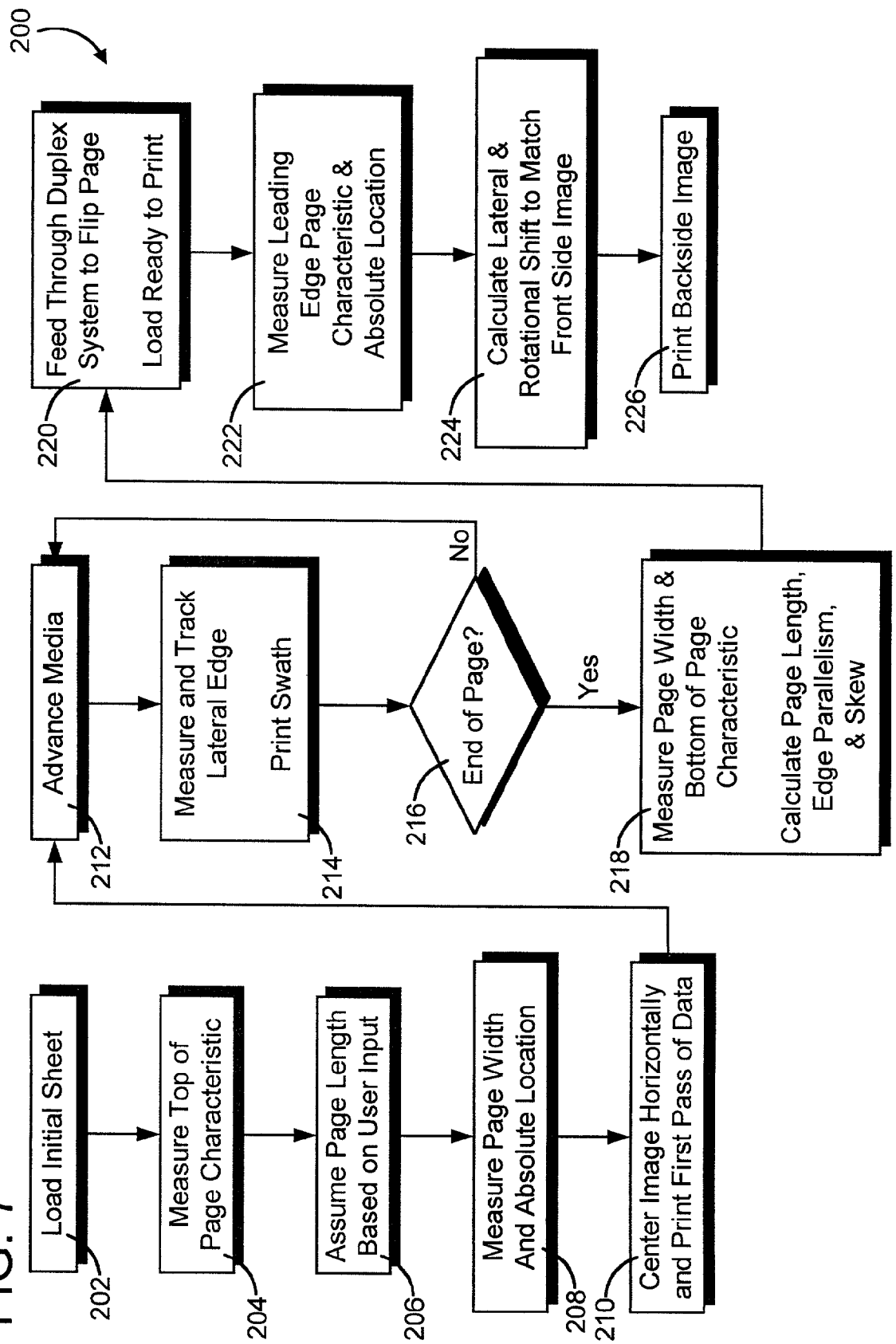

TECHNIQUES FOR ALIGNING IMAGES USING PAGE CHARACTERISTICS AND IMAGE SHIFTING

TECHNICAL FIELD OF THE DISCLOSURE

This invention relates to printing systems, and more particularly to techniques for aligning images using media characteristics and image shifting.

BACKGROUND OF THE DISCLOSURE

An exemplary application for the present invention is in printers having a duplexing function. High-end printers on the market today are typically available, either as a standard feature or more often an optional feature, with a duplexer system to enable two-sided printing. A primary purpose of a duplexer is to turn-over the print media after printing on a first or "front" side, so that an image can be placed on the second or "back" side of the print media. Typically, for the example of a laser printer, the print media starts out in the printer input tray, is picked from the input tray, and transported to a printer registration assembly. After being deskewed by the registration assembly, the media is then transported through the imaging and fusing areas to a diverter assembly. The diverter assembly typically has two moveable paper guides that determine by their position the flow of the media. The print engine firmware controls electric solenoids to determine the position of these guides. The first guide or diverter determines whether the sheet is diverted into the duplexer, or is allowed to continue on to one of the output destinations. The second diverter determines whether the sheet will be diverted to the face-down output bin or will continue straight out of the engine to the face-up output bin.

A significant challenge to the printing industry is aligning the backside image (second side printed) with the front side image (first side printed). This is especially true when the image is "full bleed" (i.e. the image extends to the edge of the sheet or page), which can be achieved through the more common process of post printing trimming operations or printing right to the edge of the page with zero margins.

Standard duplexing operations use one edge for page registration when printing the first image and the opposite edge of the media for registering the second printed image. In other words, the leading edge of the media when the first image is printed becomes the trailing edge for printing the second image. The leading and trailing edges of a print media vary in both length and parallelism. This presents problems in aligning the first side and second side images.

There are also inaccuracies in the absolute and relative placement of the lateral edge of the media on both the front side and the back side. Mechanical guides have been employed in the past to help steer the media.

SUMMARY OF THE DISCLOSURE

Techniques for printing an image on a print medium are described. In accordance with an aspect of the invention, a method for printing an image on a print medium comprises:
   positioning the print medium at a print zone;
   determining actual size and/or placement characteristics of the medium;
   using the size and placement characteristics to digitally shift an image to be printed relative to a nominal image characteristic;
   printing the shifted image on the medium.

BRIEF DESCRIPTION OF THE DRAWING

These and other features and advantages of the present invention will become more apparent from the following detailed description of an exemplary embodiment thereof, as illustrated in the accompanying drawings, in which:

FIGS. 3A-3B diagrammatically illustrate the print medium with respective front side and back side images.

FIGS. 4A-4C illustrate a misalignment between the front and back side image printing caused by shifting the medium in a lateral direction, and an image shift in accordance with the invention.

FIG. 7 is a flow diagram of steps in an exemplary implementation of a printing method in accordance with aspects of the invention.

DETAILED DESCRIPTION OF THE DISCLOSURE

Figure 1:
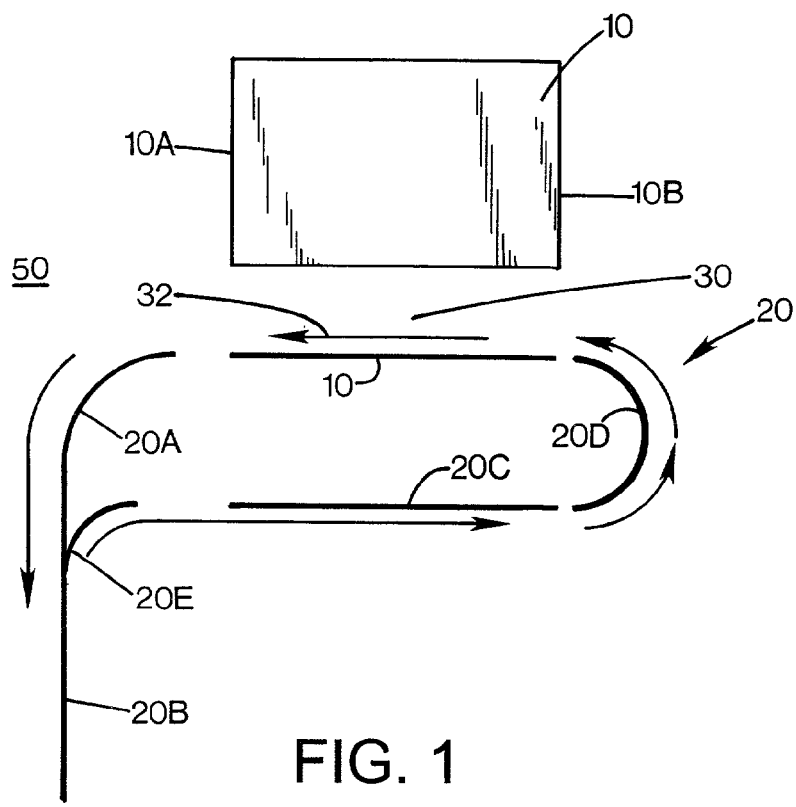
FIG. 1 is a diagrammatic illustration of a duplexing media path in a printing system.

FIG. 1 illustrates a duplex media path 20 through a printing system 50. A medium 10 in sheet form has a first edge 10A and a second edge 10B, which are transverse to the direction of media advance. While ideally these edges have the same nominal length and are perfectly parallel to each other, in practice there is some variation in length and the two edges are not parallel. The lateral edges of the media can also be non-parallel. Moreover, the medium 10 can also be rotated slightly when delivered to the system print zone 30. These variations from the nominal case present problems when the system prints in a duplex mode.

Consider the case in which the medium 10 is moved in a direction 32 on path portion 20A to the print zone 30 to print the first side (first side image). In this case, edge 10A is the leading edge, and edge 10B is the trailing edge. Once the first side printing is completed, the medium is passed along path portion 20A and into a duplex path portion 20B until the trailing edge 10B passes the path junction 20E. Now the direction of movement of the medium 10 is reversed, and the trailing edge 10B becomes the second side leading edge. This leading edge 10B is directed into path portion 20C and the medium is passed along path portion 20D to the print zone 30. As a result of the duplexing path, the medium has been flipped, so that for printing the second image on the second medium side, the leading edge is edge 10B, and the trailing edge is edge 10A.

In accordance with aspects of this invention, the printing system tracks the placement of the medium 10 in the print zone in directions orthogonal to the feed direction 30 to enable shifting the image for alignment in those directions. By measuring and tracking the media characteristics and its placement in the printer, the printer controller digitally shifts and rotates if necessary the image to optimally align the second image printed with the first image printed. This can be accomplished by digitally shifting the image, trimming the image (i.e. electronically discarding some pixels), or modifying the initial starting position of the medium (i.e. top of the sheet or form) by moving the medium. In an exemplary application, the position of the leading edge and at least one lateral edge of the media is measured, and this data used to determine position characteristics. The leading edge position may be measured at a single point, or at multiple points along the leading edge. In some applications, e.g. higher end printing systems, the media rotation relative to the feed direction is also tracked, and the controller is adapted to digitally rotate the image if necessary to optimally align the second image printed with the first image printed. If, for a given application, the image is not rotated, then measuring the leading edge position at a single point may be sufficient.

Figure 2:
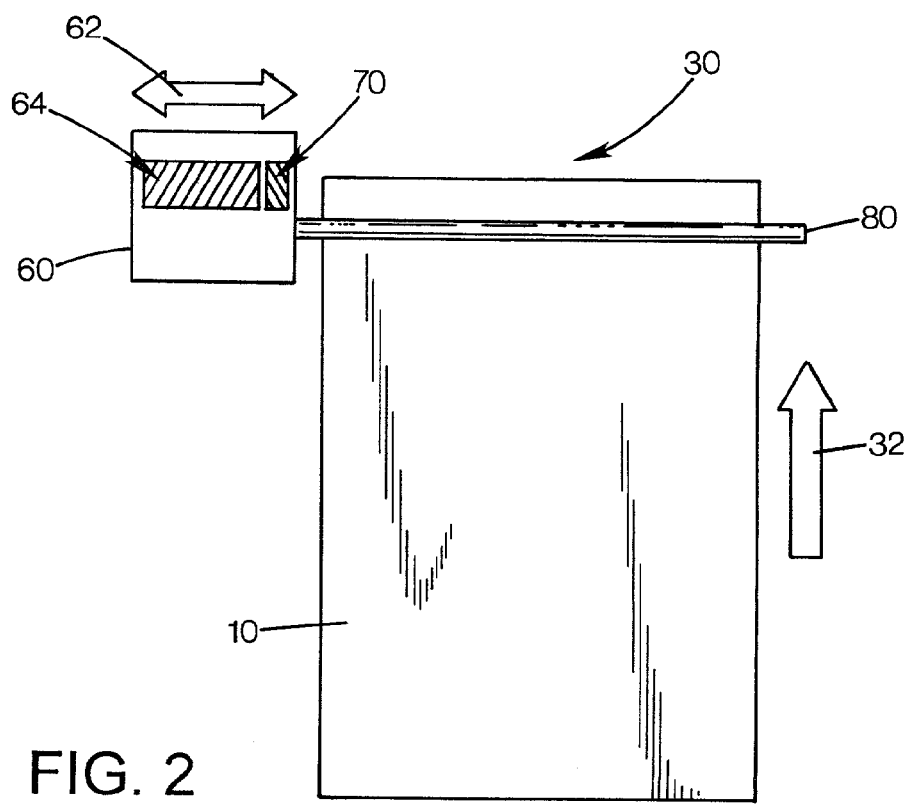
FIG. 2 is a diagrammatic top view of the printing system and the print zone.

FIG. 2 is a diagrammatic top view of the printing system 50 and the print zone 30. The system includes, in this exemplary embodiment, a scanning carriage which moves along a carriage scan direction 62 which is transverse to the print media advance direction 32. The carriage holds one or more ink jet printheads 64, which may be permanent, semi-permanent or disposable printheads, depending on the design of the printer. A slewing optical sensor 70 is mounted on the scanning carriage, and performs the function of gathering print media attributes and placement data regarding a sheet of print media being advanced to the print zone 30 by a print media advance roller 80. Thus, as the carriage is slewed across the print zone 30, the sensor can provide sensor data regarding the positions of the leading and trailing edges of the print media, and those of the left and right margins of the print media. In one exemplary embodiment, the sensor 70 includes a 1 pixel by N pixel CCD array, with a field of view to see the edge of the medium. The length of the CCD array will depend on the particular application; in an exemplary embodiment, a 1×100 pixel CCD array can be employed. In an alternative to slewing the sensor, the carriage can be parked along the medium edge, to sense the edge as the medium is moved along the media path to the print zone.

FIG. 3A diagrammatically illustrates the print medium 10 for printing a front side image, comprising in this simplified example lines 100A and 100B with an image center at 100C. The image perimeter is indicated by dotted line 100D, illustrating that the image is slightly oversized with respect to the size of the medium 10, i.e. a full bleed image. Of course, in practice, the image can be text, a color image, or a combination of text and image. Moreover, while a full bleed image is illustrated here, the invention is useful for images that have margins, i.e. images which are smaller than the media. FIG. 3A also show a back side image indicated as dashed lines 110A, 110B. The front side image is printed top to bottom, i.e. from the edge 10A to the edge 10B, in a printing direction 120 relative to the medium 10. To print the image in this exemplary embodiment, the medium is moved in direction 32 after printing each swath.

Now consider the situation after the print medium 10 has passed through the duplexing path after printing the front side image, so that the sheet has been flipped over and advanced to the print zone, with edge 10B now the leading edge. The front side to back side image alignment is important. The back side image comprising lines 110A, 110B, with image perimeter 110D is printed bottom to top, i.e. from edge 10B toward edge 10A. Ideally, the image centers of the front and back side images coincide, and the image boundary 110C coincides with the media edges for a "full bleed" image. A "full bleed" image to be printed is typically slightly oversized with respect to the size of the media on which the image is to be printed. In the printing industry, it is common to print full bleed images on oversized media, and then trim the media after printing.

Several common anomalies are illustrated in FIGS. 4A-6C, with the anomalies shown in exaggerated form for purposes of this description. FIGS. 4A-4C illustrate a misalignment caused by a print medium 10' which is not square, and by the medium 10' being shifted in a lateral direction, i.e. in a direction transverse to the media advance direction, by the media flipping process. The non-squareness of the medium 10' is evident in FIG. 4A, wherein the lateral edges are not at 90° angles with respect to the leading edges. The front side image could be rotated prior to printing to correct for leading edge misalignments. However, there is typically a "deskew" process during the media feed process to align the leading or lateral edge, and so image rotation of the front side image is typically not necessary. FIG. 4B shows the lateral shift in the medium 10', with the uncorrected position of the backside image perimeter 110D. This anomaly is solved by electronically shifting the center 110C of the back side image in the same lateral direction as the media has shifted, as illustrated in FIG. 4C. The carriage 60 has the range to move the printheads somewhat past the nominal lateral edges of the medium. The shifting is typically accomplished by shifting the printing start position, and then trimming the image data that extends beyond the edge of the medium, i.e. by discarding pixels at the lateral side(s) of the image prior to printing to accomplish the shift in the image center.

Figure 5A:
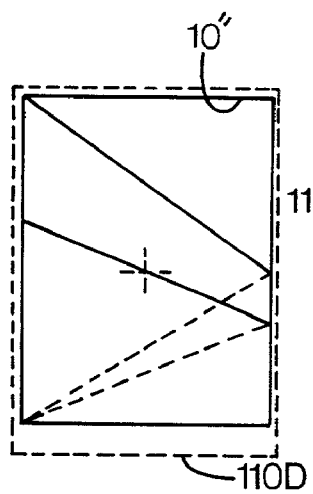
FIGS. 5A-5C illustrate a misalignment caused by a shortened print medium, and an image shift in accordance with the invention.
Figure 5B:
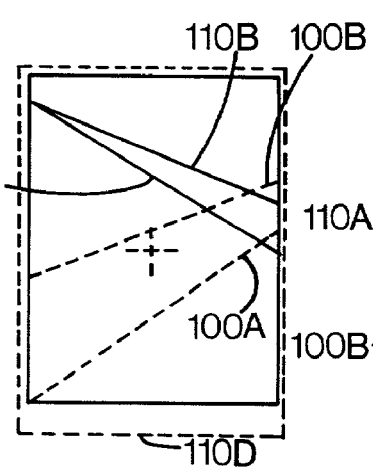
Figure 5C:
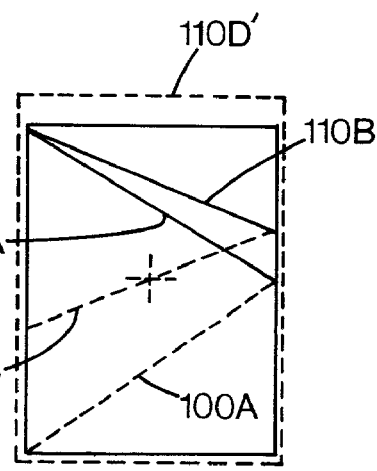

FIGS. 5A-5C illustrate the problem of a misalignment caused by a shortened or lengthened print medium, i.e. a print medium whose length is shorter or longer than a nominal sheet length. Here, for example, a short medium 10" is shown in FIG. 5A with the front side image perimeter superimposed. FIG. 5B shows the nominal misalignment of the front and back side uncorrected images, with the lines 110A, 110B at the right lateral edge offset from the front side lines 110A, 110B. To correct this anomaly, the back side image is shifted along the media feed axis to reposition the image at perimeter 110D', as shown in FIG. 5C, so that now the right edges of the image lines 110A, 110B coincide with the right edges of the front side image lines 100A, 100B.

Figure 6A:
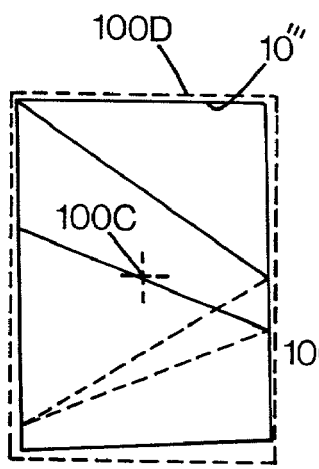
FIGS. 6A-6C illustrate a misalignment caused by non parallelism of the top and bottom edges of the print medium, and an image shift in accordance with the invention.
Figure 6B:
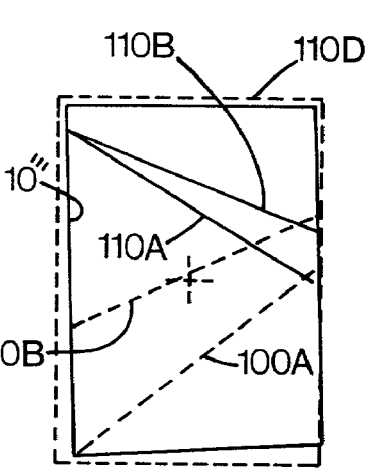
Figure 6C:
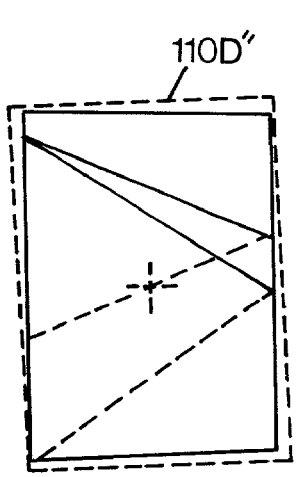

FIGS. 6A-6C illustrate a misalignment caused by non parallelism of the top and bottom edges of the print medium 10'''. FIG. 6A illustrates the medium with the perimeter 100D of the front side image and the image center 100C. FIG. 6B shows the medium 10''' after the front side image has been printed, and the medium 10''' flipped for printing the back side image, with the uncorrected position of the back side image shown by perimeter 110D. FIG. 6B shows the nominal misalignment of the front and back side uncorrected images, with the lines 110A, 110B at the right lateral edge offset from the front side lines 110A, 110B. The misalignment is addressed by shifting the center of the image in both the media advancing direction and the lateral direction (i.e. in X and in Y), and by rotation of the image. The corrected image is shown in FIG. 6C, with the perimeter 110D'' of the corrected image. Now the right terminal edges of the corresponding front and back images coincide as desired.

Figure 10:
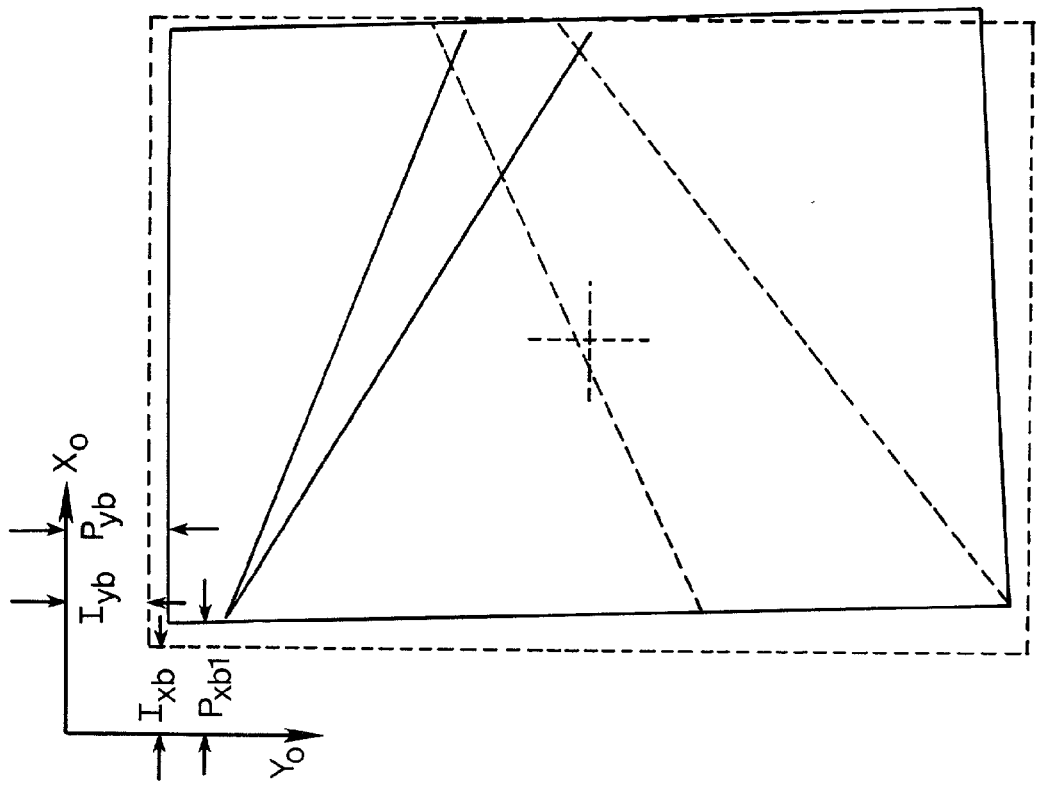
FIGS. 9 and 10 are schematic illustrations of the front and back sides of a print media, showing various parameters useful in calculating image shifts in accordance with aspects of the invention.
Figure 9:
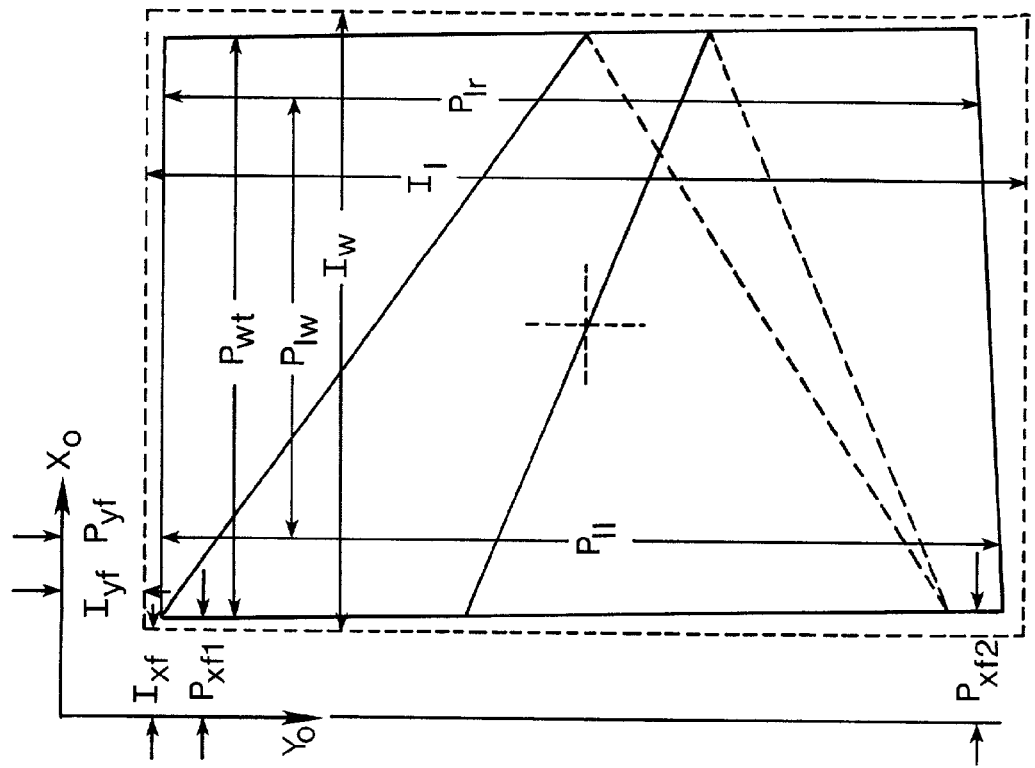

To further illustrate the digital image shifting, for an exemplary embodiment, FIGS. 9 and 10 show a front side and a back side of a print medium, wherein the leading edge of the medium is used as the registration edge. The desired data outputs are the following:

Pxf1=distance from printer datum to the lateral edge of the media on the front side leading edge.

Pxf2=distance from printer datum to the lateral edge of the media on the front side trailing edge after it is advanced into the print zone.

Pyf=distance from printer datum to the leading edge of the front side media as it is in the print zone.

Pyb=Distance from printer datum to the leading edge of the back side media as it is in the print zone.

Pwt=Page width (can be measured when loaded or anticipated based on user input).

Pll=Page length on the left side (most likely tracked as it is printed on, but can be measured prior to loading or anticipated based on user input).

Plr=Page length on the right side (most likely tracked as it is printed on, but can be set equal to Pll).

Plw=Distance between the points where Pll and Plr are measured.

Il=Image length.

Iw=Image width.

Pxbl=Distance from printer datum to the lateral edge of the media on the back side leading edge.

The following are illustrative output data and sample calculations.

Ixf=Distance from printer datum to the lateral edge of the image to be printed on the front side.

Ixf=(Pxfl−((Iw−Pwt)/2)).

Iyf=Distance from printer datum to the leading edge of the image to be printed on the front side.

Iyf=(Pyf−((Il−Pll)/2)), or =(Pyf−((Il−(Pll+Plr)/2)/2)).

Ixb=Distance from printer datum to the lateral edge of the image to be printed on the back side.

Ixb=Pxbl−(Pxf2−Ixf)−Pll*((Pll−Plr)/Plw), if image rotation is used.

Ixb=Pxbl−(Pxf2−Ixf), if image rotation is not used.

Iyb=Distance from printer datum to the leading edge of the image to be printed on the back side.

Iyb=Pyb−(Pyf−Iyf)+(Pll−Ill).

Iang=Rotation angle of image to be rotated on the back side of the media.

Iang=arctan ((Plr−Pll)/Plw).

A lateral edge could alternatively be used as the registration edge, and in this case different equations would be used.

FIG. 7 is a flow diagram of steps in an exemplary implementation of a printing method 200 in accordance with aspects of the invention. At step 202, an initial sheet of the print medium is loaded and advanced to the print zone. At 204, the top of the page characteristic is measured, i.e. the placement of the leading edge relative to the print zone. This includes at least one measured point along the leading edge. Higher end products can measure skew or angularity of the leading edge, by measuring at least two points along the leading edge. A page length is assumed at 206, based on user inputs. At 208, the page width and absolute location of the leading edge is measured to determine the position of the leading edge relative to the printhead carried by the carriage. The image is centered horizontally (laterally), and the first pass of data is printed at step 210.

At 212, the medium is advanced for the next swath. The lateral edge of the medium 10 is measured and tracked, and the next swath is printed. After completing the swath, if the end of the page has not been reached at decision 216, operation returns to step 212 to advance the medium for the next swath, and steps 214 and 216 are repeated until the end of the page is reached at 216. Once the page end is reached, the page width and bottom of the page characteristics are measured, i.e. the width dimension and optionally the angularity of the trailing edge, and the page length and optionally the edge parallelism and skew are measured.

At 220, the sheet is passed through the duplex system to flip the sheet, and return the flipped sheet to the print zone, where the trailing edge for printing the front side image is now the leading edge for printing the back side image. At 222, the leading edge page characteristic and absolute location are measured using the carriage sensor. Then at 224, the lateral and page shifts, and optionally the rotation shift, necessary to match the front side image are calculated. These shifts are applied to the back side image, and the shifted back side image is printed at 228. Instead of electronically shifting the image relative to the media, the media could be shifted in some applications to correct the misalignments illustrated in FIGS. 5A-5C.

Figure 8:
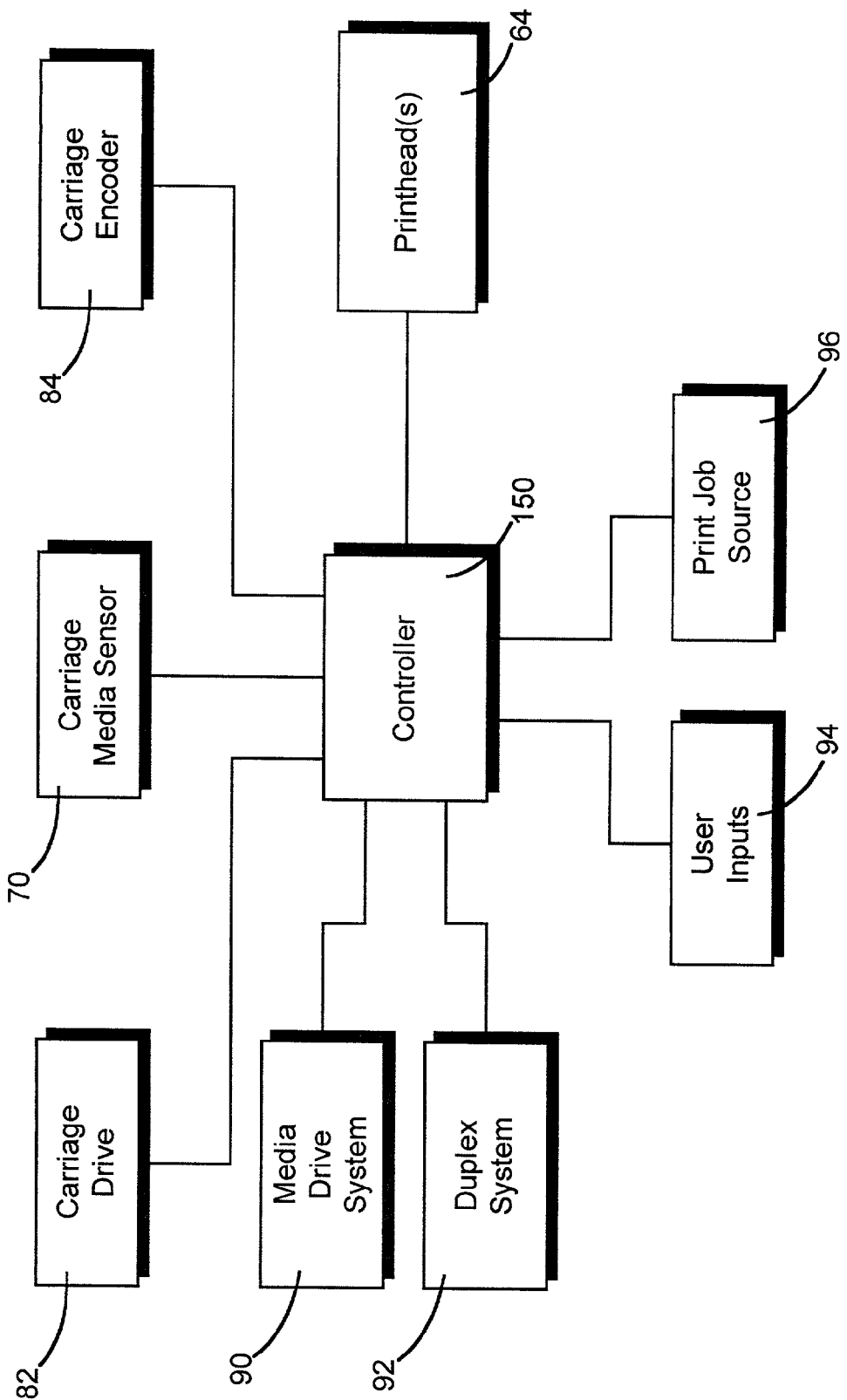
FIG. 8 is a simplified schematic block diagram of aspects of a printing system which can embody aspects of the invention.

FIG. 8 is a simplified schematic block diagram of aspects of a printing system which can embody aspects of the invention. A controller 150 such as a microcomputer or ASIC receives print job commands and data from a print job source 96, which can be a personal computer, digital camera or other known source of print jobs. Commands can typically also be entered via user input 94. The controller acts on the received commands to activate the media drive system 90 to advance a print medium sheet along a media path to the print zone. The controller is responsive to sensor data from the carriage media sensor 70. The carriage drive 82 is driven by the controller to position the carriage holding the printhead(s) 64 for commencement of a print job, and to scan the carriage in a direction transverse to the media path. Firing pulses are sent to the printhead(s) 64. The controller receives encoder signals from the carriage encoder 84 to provide position data for the carriage. The controller is programmed to advance incrementally the sheet using the media drive system 90 to position the sheet for successive swaths, and to eject the completed sheet into the output tray, or alternatively activate the duplex system 92 for duplex printing.

An advantage of the alignment technique is automatic registration of the first and second side images that will eliminate page-to-page and batch-to-batch variations.

The image shifting technique also has utility in simplex printing. In this case, the leading edge is measured, and optionally the page distance to the trailing edge, to determine the image shift in the media feed direction. The absolute position of the lateral edge and the overall width is measured to determine the shift of the image in the lateral direction. Optionally the leading edge data can be used to determine absolute rotation of the medium, to calculate a matching rotation of the image.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method for printing an image on a print medium, comprising:

positioning a front side of the print medium within a print zone to allow printing on a front side image on the front side of the print medium;

scanning a carriage containing one or more inkjet print heads while detecting at least one edge of the print medium using a sensor located over the print medium;

calculating print medium and placement characteristics based upon the detecting the at least one edge of the print medium to determine calculated print medium and placement characteristics for the print medium;

passing the print medium through a duplexing path that flips the print medium and presents a back side of the print medium in the print zone for printing a back side image;

utilizing the placement characteristics to shift the back side image to align with the front side image, wherein shifting the back side image includes digitally shifting the back side image in a direction aligned with or transverse to a medium advance axis after the print medium is flipped and when the print medium is non-square and wherein the shifting the back side image includes digitally rotating the back side image after the print medium is flipped and when the print medium is non-parallel; and printing the image on the medium.

2. The method of claim 1 wherein the image extends from lateral edge to lateral edge of the medium.

3. The method of claim 1 wherein said actual medium size and placement characteristics include an absolute location of a point on a leading edge of the medium.

4. The method of claim 1 wherein said actual medium size and placement characteristics include a skew characteristic of a leading edge of the medium.

5. The method of claim 1 wherein said actual medium size and placement characteristics include a medium width characteristic.

6. The method of claim 1 wherein said shifting said image includes digitally shifting the image in a direction aligned with or transverse to a medium advance axis.

7. The method of claim 1 wherein said shifting said image includes digitally rotating the image.

8. The method of claim 1 wherein said shifting said image includes shifting the position of the print medium along said media feed path.

9. The method of claim 1 wherein an area of the image is smaller than an area of the medium, so that margins are provided on the medium after said printing.

10. A method for duplex printing an image on a print medium, comprising:

positioning a front side of the print medium within a print zone;

scanning a carriage containing one or more inkjet print heads while detecting at least one edge of the print medium using a sensor located over the print medium;

calculating print medium and placement shift parameters based upon the detecting the at least one edge of the print medium to determine calculated print medium and placement characteristics for the print medium;

passing the print medium through a duplexing path to flip the print medium and present the back side of the print medium at the print zone for printing a back side image;

measuring leading edge and absolute location characteristics of the flipped print medium;

utilizing the placement shift parameters to shift the back side image to align with the front side image placement, wherein shifting the back side image includes digitally shifting the image in a direction aligned with or transverse to a medium advance axis after the print medium is flipped and when the print medium is non-square and wherein the shifting the back side image includes digitally rotating the image after the print medium is flipped and when the print medium is non-parallel;

printing a shifted back side image.

11. The method of claim 10 wherein the front and back side images extend from lateral edge to lateral edge of the medium.

12. The method of claim 10 wherein said actual medium size and placement characteristics include an absolute location of a point on a leading edge of the medium.

13. The method of claim 10 wherein said actual medium size and placement characteristics include a skew characteristic of a leading edge of the medium.

14. The method of claim 10 wherein said actual medium size and placement characteristics include a medium width characteristic.

15. The method of claim 10 wherein said shifting said back side image includes shifting the position of the print medium along said media feed path.

16. The method of claim 10 wherein an area of the front side image is smaller than an area of the medium, and an area of the back side image is smaller than said area, so that margins are provided on the medium after said printing of said front side image and said back side image.

17. The method of claim 10, wherein said determining actual size and placement characteristics of the medium is performed without printing on said print medium.

* * * * *